Patented Sept. 19, 1922.

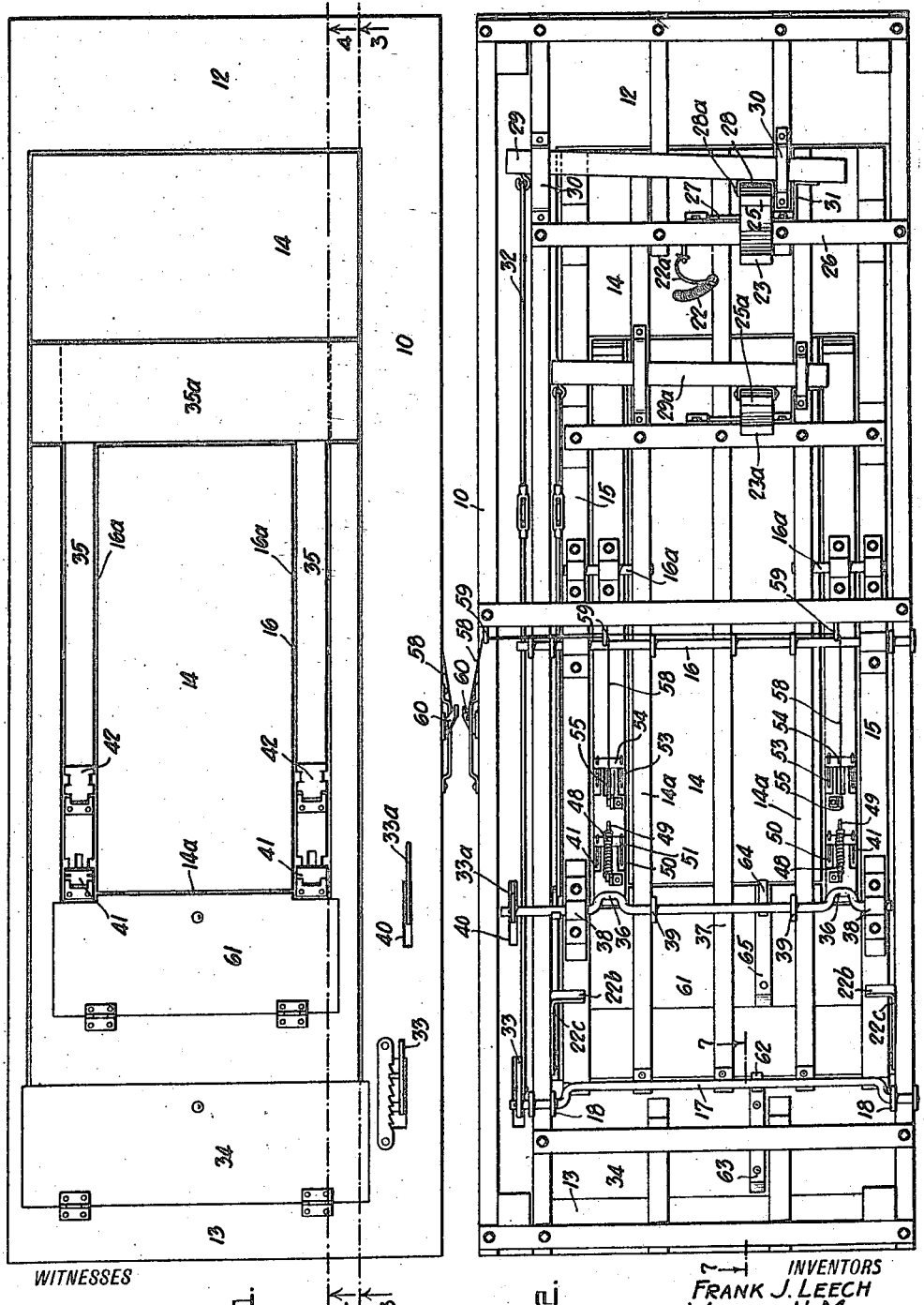

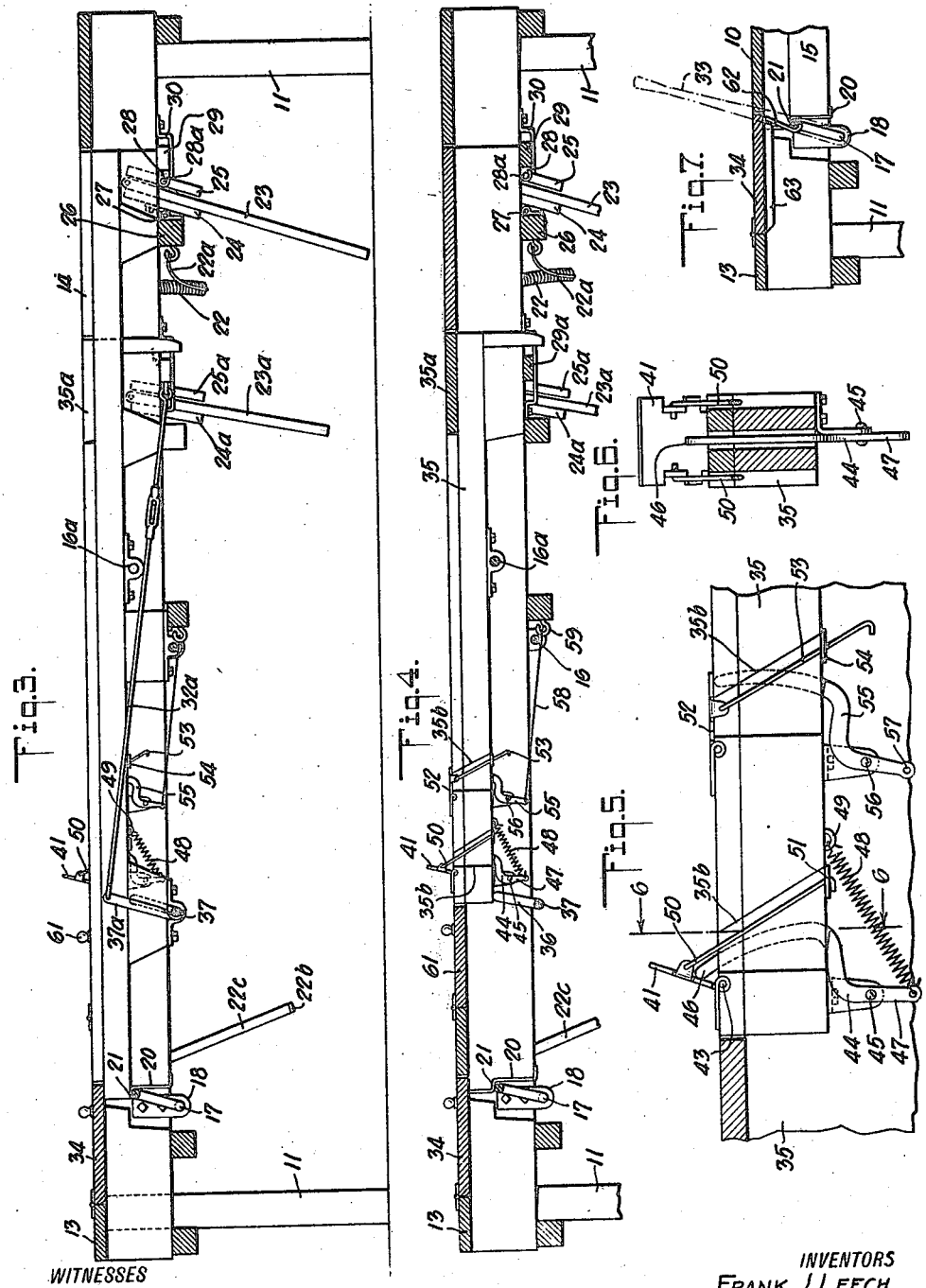

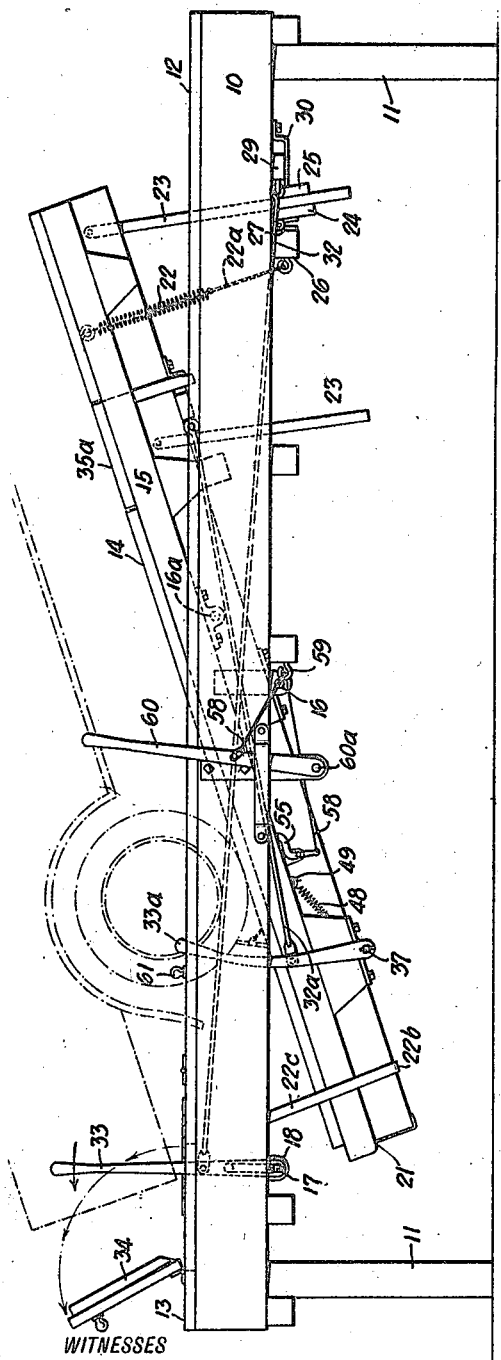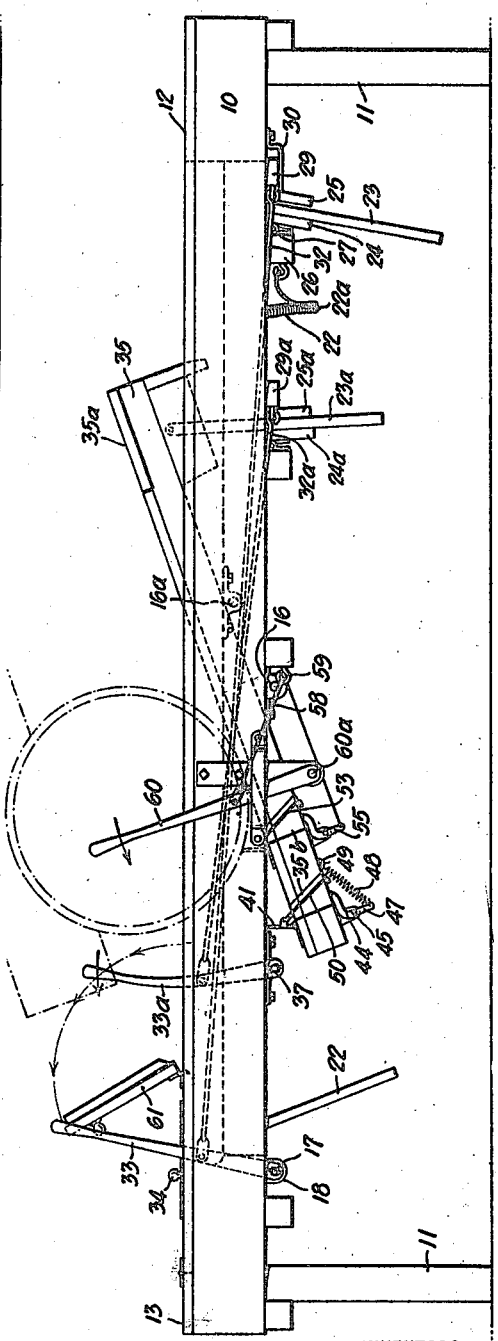

1,429,892

UNITED STATES PATENT OFFICE.

FRANK J. LEECH, OF OTTAWA, AND WILLIAM H. MYERS, OF UTICA, ILLINOIS.

COMBINED WAGON AND AUTOMOBILE DUMP.

Application filed July 16, 1920. Serial No. 396,728.

*To all whom it may concern:*

Be it known that we, FRANK J. LEECH and WILLIAM H. MYERS, citizens of the United States, and residents, respectively, of Ottawa, in the county of La Salle and State of Illinois, and Utica, in the county of La Salle and State of Illinois, have invented a new and Improved Combined Wagon and Automobile Dump, of which the following is a description.

Our invention relates to vehicle dumps of the type in which the wheel supports for the vehicle are adapted to assume a position for tilting the vehicle bodily and in which provision is made for receiving and dumping either a wagon, or an automobile truck.

The present invention is designed as an improvement on the invention forming the subject matter of an application filed by us July 11, 1919, Serial Number 310,273, and is characterized by a novel form and arrangement of the means for controlling the tiltable elements provided for dumping an automobile or those tilting elements provided for dumping a wagon, the invention including a different arrangement of the levers involved in the control means as well as a novel brake, and by a novel relation of the brakes to the latch-releasing levers.

The invention is furthermore characterized also by a novel arrangement of chocks and controlling means therefor.

Other distinctive features will appear as the description proceeds.

Reference is to be had to the accompanying drawings forming a part of this specification, it being understood that the drawings are merely illustrative of one example of the invention.

Figure 1 is a plan view of a combined wagon and automobile dump embodying our invention;

Figure 2 is an inverted plan view thereof;

Figure 3 is a longitudinal vertical section as indicated by the line 3—3, Figure 1;

Figure 4 is a similar section on the line 4—4, Figure 1;

Figure 5 is a detail in longitudinal vertical section, the view being given to aid in an understanding of the chocks and means associated therewith;

Figure 6 is a transverse vertical section on the line 6—6, Figure 5;

Figure 7 is a detail in longitudinal vertical section in a plane corresponding with the line 7—7, Figure 2, but with the dump structure in normal position and not inverted as in Figure 2;

Figure 8 is a side elevation with the combined dump in tilted position for the dumping of an automobile truck or the like;

Figure 9 is a similar view with only the wagon dump in tilted position for the dumping of the wagon.

In carrying out our invention in accordance with the illustrated example a suitable fixed frame 10 is provided, the frame being here shown as supported on legs 11. On the frame fixed platform sections 12 and 13 are provided at the front and rear ends respectively on which vehicles may roll to and from the dumping elements.

A dumping platform 14 is provided presenting side stringers 15 within fixed stringer-like sides of frame 10 and mounted to tilt with the transverse shaft or rod 16 as a center. Latch means is provided at the rear end of the platform 14 to hold the same in the raised position at a level with the roadway. Said latch means is in the form of a transverse rock shaft 17 turning in hanger bearings 18 or their equivalent on the frame 10, said shaft being offset or of cranked form at the center and for its major portion so as to swing beneath or away from the adjacent rear end of the platform 14. One end of the shaft 17 is provided with a lever handle 33 hereinafter referred to for turning it to and from the latching position. In the latching position the shaft 17 engages in gains or rabbets 21 formed in the ends of the stringers 15 which are faced at said rabbets with metal straps 20 to take the wear. When an automobile truck or the like is driven on the platform 14 and the latch 17 is released, the rear end of said platform will drop to tilt the automobile to permit the contents to readily flow therefrom.

The tilting movement of platform 14 in the present example of our invention is checked by a spring 22 secured at one end to said platform and connected by a short cord 22ª or equivalent means with a fixed part of the structure. The tilting movement finally is arrested by the lateral bent ends 22ᵇ of hangers 22ᶜ obliquely disposed at the under side of the fixed structure. The movement of the platform 14 to the dumping position is controlled in the illustrated form of our invention as follows: A depending bar 23 is pivotally secured at its upper end to said platform adjacent to the forward end. From its pivotal point said bar 23 extends downwardly between a brake block 24 and a brake shoe 25, said brake block being rockably mounted between its ends on a transverse bar 26 or other fixed part through the medium of a hinge pintle 27, or the like. The brake shoe 25 is pivotally secured between its ends as at 28ª to a bracket 28 on a brake beam 29 supported in keepers 30 on the under side of the fixed structure, one end of the brake beam being fulcrumed in any suitable manner as by an angle bracket 31 thereon through which the adjacent end of the hinge pintle 27 loosely extends. The other end of brake beam 29 is secured to a brake rod 32 extending longitudinally of the structure, the opposite end of said rod being connected to a hand lever 33 on latch shaft 17 so that one and the same lever operates the latch shaft 17 and controls the brake beam 29.

The fixed platform section 13 has an opening therein covered by a hinged board 34 adapted to be raised for permitting the contents of the automobile truck to be discharged into the pit which extends beneath the rear end of the frame.

The wheels of the automobile and the wagon wheels as well when arriving at the platform 14 run on stringers 35 which are rockable on short shafts 16ª so as to drop to a tilted dumping position, and means is provided to sustain the stringers 35 in fixed relation to the platform 14 except when it is desired to dump a wagon. The rear ends of the stringers 35 are adapted to be engaged by the offset or cranked portions 36 of a transverse latch shaft 37 which is rockable to throw its cranked or latching portions 36 into or out of engagement with the adjacent ends of the stringers.

The dumping movement of the stringers 35 is controlled by brake means corresponding with brake means for the platform 14, there being a depending member 23ª pivotally hung at its upper end on a transverse platform section 35ª connecting the stringers 35 at the front ends. The depending member 23ª extends between a brake block 24ª and brake shoe 25ª mounted in a manner described with respect to block 24 and shoe 25, the brake beam 29ª to which the shoe 25ª is pivotally secured, being connected at one end with a brake rod 32ª, the opposite end of which is secured to an arm 37ª on the latch shaft 37 provided with an operating lever 33ª, so that the same lever 33ª operates said latch shaft and controls the brake beam 29ª. The latch shaft 37 turns in a suitable bearing 38 on the platform 14 and intermediate bearings 39 of longitudinal beams 14ª of said platform. The lever 33ª extends upwardly through a slot 40 in the adjacent side of the fixed structure 10 so that it and the shaft 37 may rise and fall with the tilting of the platform 14 but said shaft 37 will remain stationary with the platfrom 14 when the stringers 35 are tilted to dumping position.

We provide a pair of chocks or wheel blocks 41 on stringers 35 and a second pair of chocks or wheels blocks 42 on said stringers and distant from the first blocks, so that vehicles of different lengths of wheel base may be chocked. The chocks 41 are hingedly secured at one end as at 43 to swing upwardly at an angle to the stringers to thereby offer an obstruction or to be lowered onto the stringers. Levers 44 are fulcrumed as at 45 at the under side of the frame 10 and the upper ends 46 thereof are disposed adjacent to the under side of chocks 41. The short arms 47 of levers 44 have connected therewith retractile springs 48, the opposite ends of the springs being secured as at 49 to the stringers 35. To each chock 41 are secured the upper ends of guide rods 50 which extend freely through brackets 51 on stringers 35. The springs 48 normally tend to maintain the chocks 41 raised so that the wheels of a vehicle backing onto the dump move rearwardly along the stringers 35 and will be engaged by the chocks 41. The vehicle moving in the opposite direction will automatically depress the chocks 41 and after the wheels pass the chocks the latter will automatically rise under the action of the springs 48. The additional chocks 52 normally tend to lie flat on the stringers 35 under their own gravity; said chocks having guide rods 53 pivotally connected therewith, said guide rods passing through brackets 54 on the stringers. The stringers 35 have cutouts or recesses 35ᵇ for the guide rods 50, 53, to lie within the planes of the adjacent sides of the stringers. The levers 55 are fulcrumed as at 56 to the stringers 35 and extend upwardly through the stringers so that their upper ends lie adjacent to chocks 52. The short arms of the levers 55 have eyes 56, 57 or equivalent means to which one end of an operating cord 58 is secured. The cords 58 from the respective levers 54 pass through suitable guides 59 and are secured to an operating lever 60 suitably fulcrumed as at 60ª to any fixed part of the structure.

With the described construction, if a wagon is to be dumped, it is run onto the stringers 35, the wheel blocks 42 are thrown to the raised position by throwing the lever 60 and the latch shaft 37 rocked to release said stringers and permit them to assume under the weight of the load an inclined position as indicated in Fig. 4, the platform 14 remaining in the raised position. In the movement to the inclined position the stringers 35 are controlled by the lever 60 which is initially thrown to a position to release the stringers and given a continued movement to act on the brake lever 28ª through connecting rod 32ª.

In dumping grain from a wagon the grain drops through an opening covered by a hinged door 61 which door is raised for the purpose. When an automobile truck is to be dumped if it is backed onto the stringers 35, the wheels will be engaged by the chocks 41 or if the automobile is driven forwardly the wheels will automatically depress said chocks until they have automatically passed over the same when the chocks will automatically rise. For the dumping of the automobile, the stringers 35 are maintained held by their latch shaft 37 and the lever 33 is thrown to so rock the latch shaft 17 as to release the rear end of the platform 14, the brake having been applied with the throwing of the lever, so that the combined dump may assume a tilted position, shown in Figure 3, the stringers 35 being constrained to remain in the plane of the platform 14.

In order to prevent the operation of the latch means and the release of the dumping platform 14 before the door 34 is raised, and otherwise to prevent the accidental tilting of the platform, we provide for controlling the latch means by said door for which purpose, we provide, (see Figures 2 and 7), an arm 62 on the latch shaft 17 and extending adjacent to the plane of the door 34, said door having a cleat 63 thereon at the under side or equivalent means to engage the arm 62 when the shaft 17 is in the latching position engaging the stringers 15. Thus, the latch shaft cannot be rocked to release the platform until the door 34 is raised. Similarly, the latch shaft 37 has an arm 64 thereon extending adjacent to the plane of the door 61 and said door has a cleat 65 thereon to engage said arm when said door is in the closed position.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim:

1. A structure of the class described including a tiltable dumping device onto which a vehicle may be run to dump with the tilting of said device, and brake means therefor comprising a depending element pivotally secured at its upper end to said tilting device, pivotally mounted braking elements between which the first-mentioned element has guided movement, and optionally operable means to cause said second-mentioned braking elements to have braking engagement with the first element.

2. A structure of the class described including a tiltable dumping device onto which a vehicle may be run to dump with the tilting of said device, and brake means for said device comprising an element depending at the under side of said tiltable device and pivotally secured thereto, and means variably movable to exert lateral braking pressure against said pivoted element.

3. A structure of the class described including a tiltable dumping device onto which a vehicle may be run to dump with the tilting of said device, and brake means for said device comprising an element depending at the under side of said tiltable device and pivotally secured thereto, and means to exert braking action on said element, said last-mentioned means including a brake beam, operating means therefor, and a brake shoe rockably mounted between its ends on said beam and adapted to engage the depending element.

FRANK J. LEECH,
WILLIAM H. MYERS.